United States Patent
Cao et al.

(10) Patent No.: US 9,948,722 B2
(45) Date of Patent: Apr. 17, 2018

(54) PATH COMPUTATION ELEMENT COMMUNICATION PROTOCOL SESSION ESTABLISHMENT METHOD AND DEVICE

(71) Applicant: ZTE Corporation, Shenzhen, Guangdong (CN)

(72) Inventors: Xuping Cao, Shenzhen (CN); Zhihong Wang, Shenzhen (CN); Gang Lu, Shenzhen (CN); Jia Qian, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 595 days.

(21) Appl. No.: 14/389,485

(22) PCT Filed: Apr. 9, 2013

(86) PCT No.: PCT/CN2013/073984
§ 371 (c)(1),
(2) Date: Sep. 30, 2014

(87) PCT Pub. No.: WO2013/152718
PCT Pub. Date: Oct. 17, 2013

(65) Prior Publication Data
US 2015/0095506 A1    Apr. 2, 2015

(30) Foreign Application Priority Data
Apr. 10, 2012    (CN) .......................... 2012 1 0103317

(51) Int. Cl.
G06F 15/16    (2006.01)
H04L 29/08    (2006.01)
(Continued)

(52) U.S. Cl.
CPC ............ H04L 67/141 (2013.01); H04L 45/42 (2013.01); H04L 67/14 (2013.01); H04L 69/14 (2013.01); H04L 69/16 (2013.01); H04L 69/168 (2013.01)

(58) Field of Classification Search
CPC ....... H04L 45/42; H04L 67/14; H04L 67/141; H04L 69/14; H04L 69/16; H04L 69/168
See application file for complete search history.

(56) References Cited

U.S. PATENT DOCUMENTS

| 8,358,662 B2 | 1/2013 | Bernstein et al. |
| 2009/0125633 A1* | 5/2009 | Watsen ................. H04L 63/029 709/229 |

(Continued)

FOREIGN PATENT DOCUMENTS

| CN | 101437022 A | 5/2009 |
| CN | 101984602 A | 3/2011 |

(Continued)

OTHER PUBLICATIONS

Path Computation Element (PCE) Communication Protocol (PCEP) Mar. 2009.

(Continued)

*Primary Examiner* — Normin Abedin
(74) *Attorney, Agent, or Firm* — Oppedahl Patent Law Firm LLC

(57) ABSTRACT

Disclosed are a path computation element communication protocol (PCEP) session establishment method and device. The technical solution comprises: at a PCC or PCE node device side, before needing to establish a PCEP session, allocating a TCP connection communication end attribute to a PCC or a PCE at either end in the manner of static configuration/dynamic designation or election mechanism automatic allocation; or detecting whether to establish a TCP connection relationship, if not, actively connecting the (Continued)

opposite end, and if a plurality of TCP connection relationships has been established, simultaneously cutting off a plurality of connections at both ends, and reinitiating a TCP connection after waiting a random time respectively. The present invention achieves the establishment of a PCEP session in the multi-PCE cooperation computation scenario under the condition of meeting two constraint conditions which are specified by a protocol.

3 Claims, 3 Drawing Sheets

(51) Int. Cl.
  *H04L 29/06* (2006.01)
  *H04L 12/717* (2013.01)

(56) References Cited

U.S. PATENT DOCUMENTS

2009/0217347 A1* 8/2009 Chen ............... H04L 45/00 726/1

| | | | |
|---|---|---|---|
| 2010/0054267 | A1 | 3/2010 | Bernstein |
| 2011/0225230 | A1 | 9/2011 | Russ |
| 2011/0282998 | A1 | 11/2011 | Johnsson |

FOREIGN PATENT DOCUMENTS

| | | |
|---|---|---|
| CN | 102238185 A | 11/2011 |
| CN | 102292963 A | 12/2011 |
| CN | 102624745 A | 8/2012 |

OTHER PUBLICATIONS

An Open GMPLS-enabled Control Plane testbed for remote development and experimentation of PCE-based path computation algorithms Jun. 15, 2011.
International Search Report in international application No. PCT/CN2013/073984, dated Jul. 18, 2013.
English Translation of the Written Opinion of the International Search Authority in international application No. PCT/CN2013/073984, dated Jul. 18, 2013.
Supplementary European Search Report in European application No. 13775429.7, dated Jun. 1, 2015.

\* cited by examiner

PATH COMPUTATION ELEMENT COMMUNICATION PROTOCOL SESSION ESTABLISHMENT METHOD AND DEVICE

TECHNICAL FIELD

The disclosure relates to the field of Path Computation Element (PCE) Communication Protocol (PCEP) technology, and in particular to a method and device for establishing a PCEP session.

BACKGROUND

Distributed in an Automatically Switched Optical Network (ASON) architecture defined in ITU-T G.8080 are control-plane node equipment each containing a Route Controller (RC) component providing a connection controller with route information for connection inside a domain of responsibility. Such route information is end-to-end, or may be based on next-hop. In addition, to achieve network management, the RC can also respond to topology requesting information.

With development of a Multi-Protocol Label Switching (MPLS)/Generalized Multi-Protocol Label Switching (GMPLS) network, network topology becomes increasingly complicated with enormous amount of routes, and path computation becomes increasingly complicated as well. Meanwhile, traffic projecting requires a network equipment to perform route computation under complicated constraints. such complicated computation often requires a lot of CPU computing resources and memory resources, impacting hardware performance of the network equipment and stability of the entire network to some extent.

Accordingly, IETF PCE workgroup proposes an MPLS/GMPLS network structure based on a Path Computation Element (PCE). In such a structure, based on known network topology and a known constraint, a PCE, as a functional entity dedicated to path computation in a management domain, computes an optimal path meeting the constraint according to a request of a Path Computation Client (PCC). A PCE may be located anywhere in the network, for example by being integrated in a network equipment such as a Label Switch Route (LSR) or an Operating System (OS), or may be a separate equipment. Communication between a PCC and a PCE as well as between a PCE and a PCE is performed via a PCE Communication Protocol (PCEP).

RFC 5440 describes in particular a PCEP architecture including a transport layer adopting a TCP, a transport port 4189, with 7 PCEP message type defined. RFC 5440 specifies that what must be accomplished at an initial stage of establishing communication between a PCC and a PCE are: 1) establishment of a TCP connection between the PCC and the PCE via three handshakes; and 2) establishment of a PCEP session based on the TCP connection. RFC 5440 specifies two constraints that: 1) at any time, any pair of PCEP communicating ends can have only one PCEP session; 2) at any time, there can be only one TCP connection between any pair of PCEP communicating ends.

However, in multi-PCE collaboration, including intra-domain collaborative computation by multiple PCEs, inter-domain collaborative computation by multiple PCEs, and collaborative computation by parent and offspring PCEs in a hierarchic PCE architecture, a PCE will serve as a TCP server in monitoring at a port 4189 a message sent by a PCC, and also will serve as a TCP client in actively seeking connection to another PCE for PCEP message exchange. An implementing mechanism among such PCEs in collaborative computation has to be formulated to meet the two constraints.

SUMMARY

In view of this, it is desired that embodiments of the disclosure provide a method and device for establishing a PCEP session, capable of establishing, in a scenario of multi-PCE collaborative computation, a PCEP session among PCEs in collaborative computation while meeting the two constraints.

To this end, a technology solution of an embodiment of the disclosure is implemented as follows.

An embodiment of the disclosure provides a method for establishing a Path Computation Element Communication Protocol (PCEP) session, including steps of:

at a Path Computation Client (PCC) or a Path computation Element (PCE) node equipment side, when it is required to establish a PCEP session between the PCC and another PCE or between the PCE and another PCC or another PCE, allocating, via static configuration or dynamic designation, an attribute of the PCC or the PCE node equipment as a communicating end of a TCP connection for the PCEP session as a server or a client; or at a PCC or a PCE node equipment side, when it is required to establish a PCEP session between the PCC and another PCE or between the PCE and another PCC or another PCE, automatically allocating, via an electing mechanism, an attribute of the PCC or the PCE node equipment as a communicating end of a TCP connection for the PCEP session as a server or a client; or at a PCC or a PCE node equipment side, when a requirement for triggering establishment of a PCEP session is met, first detecting whether there is an established TCP connection to a peer PCE or a peer PCC with which the PCEP session is to be established; when there is no established TCP connection, actively seeking, by the PCC or the PCE, a TCP connection to the peer as a client; when there is an established TCP connection, detecting whether there are multiple TCP connections established; when no more than one established TCP connection is detected and no PCEP session has been established with the peer PCE or the peer PCC, activating a flow of PCEP session establishment; otherwise when multiple TCP connections established are detected, simultaneously disconnecting the multiple TCP connections detected, and actively seeking, by the PCC or the PCE, a TCP connection to the peer as a client after waiting a random period of time.

In an embodiment, the electing mechanism may include at least that of:

electing a PCC or a PCE with a greater IP address as a server or a client;

electing in an autonomous domain a PCC or a PCE with a greater area identifier as a server or a client; and electing a PCC or a PCE with a greater autonomous domain identifier as a server or a client.

In an embodiment, the requirement for triggering establishment of a PCEP session may include at least a PCE node activation or a special event; and the special event may include at least a timer event or a PCEP message event.

In an embodiment, after the multiple TCP connections detected are simultaneously disconnected, a PCC or a PCE at one end of one of the disconnected TCP connections may determine a local random period of time, and wait the local random period of time before actively seeking the TCP connection to the peer.

In an embodiment, the method may further include a step of:

after the step of actively seeking, by the PCC or the PCE, a TCP connection to the peer, executing again, by the PCC or the PCE, the step of detecting whether there is an established TCP connection to a peer PCE or a peer PCC with which the PCEP session is to be established.

An embodiment of the disclosure further provides a device for establishing a Path Computation Element Communication Protocol (PCEP) session, applying to a Path Computation Client (PCC) or a Path computation Element (PCE) node equipment side;

the device including a communicating end attribute configuring element and a PCEP session establishing element;

the communicating end attribute configuring element being configured for: when it is required to establish a PCEP session between the PCC and another PCE or between the PCE and another PCC or another PCE, allocating, via static configuration or dynamic designation, an attribute of the PCC or the PCE node equipment as a communicating end of a TCP connection for the PCEP session as a server or a client; and the PCEP session establishing element being configured for: establishing the PCEP session between the PCC and a peer PCE, or establishing the PCEP session between the PCE and a peer PCC or a peer PCE;

or the device including an electing element and a PCEP session establishing element;

the electing element being configured for: when it is required to establish a PCEP session between the PCC and another PCE or between the PCE and another PCC or another PCE, automatically allocating, via an electing mechanism, an attribute of the PCC or the PCE node equipment as a communicating end of a TCP connection for the PCEP session as a server or a client; and the PCEP session establishing element being configured for: establishing the PCEP session between the PCC and a peer PCE, or establishing the PCEP session between the PCE and a peer PCC or a peer PCE;

or the device including:

a first determining element configured for: when a requirement for triggering establishment of a PCEP session is met, detecting whether there is an established TCP connection to a peer PCE or a peer PCC with which the PCEP session is to be established;

an active connection element configured for: when there is no established TCP connection, actively seeking a TCP connection to the peer as a client;

a second determining element configured for: when there is an established TCP connection, detecting whether there are multiple TCP connections established;

a third determining element configured for: when no more than one established TCP connection is detected, determining whether a PCEP session has been established with the peer PCE or the peer PCC;

a PCEP session establishing element configured for: when no more than one established TCP connection is detected and no PCEP session has been established with the peer PCE or the peer PCC, activating a flow of PCEP session establishment; and a re-connecting element configured for: when multiple TCP connections established are detected, simultaneously disconnecting the multiple TCP connections detected, and actively seeking a TCP connection to the peer as a client after waiting a random period of time.

In an embodiment, the electing mechanism may include at least that of:

electing a PCC or a PCE with a greater IP address as a server or a client;

electing in an autonomous domain a PCC or a PCE with an area identifier as a server or a client; and electing a PCC or a PCE with a greater autonomous domain identifier as a server or a client.

In an embodiment, the requirement for triggering establishment of a PCEP session may include at least a PCE node activation or a special event;

the special event may include at least a timer event or a PCEP message event.

In an embodiment, after the multiple TCP connections detected are simultaneously disconnected, a re-connecting element at one end of one of the disconnected TCP connections may determine a local random period of time, and wait the local random period of time before actively seeking the TCP connection to the peer.

In an embodiment, the active connection element may be configured for: after actively seeking a TCP connection to the peer, again triggering the first determining element to execute the detecting whether there is an established TCP connection to a peer PCE or a peer PCC with which the PCEP session is to be established.

Embodiments of the disclosure provide a solution for PCEP session establishment in a scenario of multi-PCE collaborative computation, meeting two protocol-specified constraints that: 1) at any time, any pair of PCEP communicating ends can have only one PCEP session; 2) at any time, there can be only one TCP connection between any pair of PCEP communicating ends.

DETAILED DESCRIPTION

To clearly show a technical problem to be solved, a technical solution, and beneficial effects of the present disclosure, the present disclosure is further elaborated below with reference to the drawings and embodiments.

Figure 1:
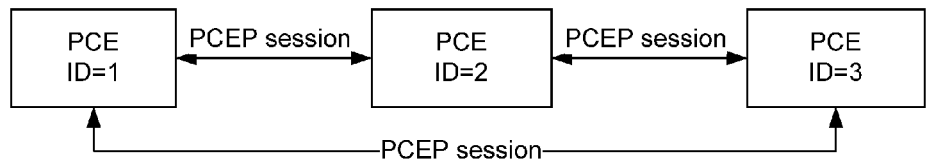
FIG. 1 is a schematic diagram of a scenario of PCEP session establishment among three PCEs in multi-PCE collaborative path computation according to an embodiment of the disclosure.

FIG. 1 is a schematic diagram of a scenario of PCEP session establishment among three PCEs in multi-PCE collaborative path computation according to an embodiment of the disclosure. In an MPLS/GMPLS network, PCE1, PCE2, and PCE3 are required to perform collaborative path computation. Assuming that path computation is required among all three PCEs, the three PCEs therefore neighbor each other, and a PCEP session is required to be established between each two of the three PCEs.

Embodiment 1

In the embodiment, at a Path Computation Client (PCC) or a Path computation Element (PCE) node equipment side, when it is required to establish a PCEP session between the PCC and another PCE or between the PCE and another PCC or another PCE, an attribute of the PCC or the PCE node equipment as a communicating end of a TCP connection for the PCEP session is allocated, via static configuration or dynamic designation, as a server (intercepting connection of another PCC or PCE at a communication port 4189) or a client (actively seeking connection to a PCC or PCE node performing a monitoring service at a communication port 4189).

A device for implementing the method for establishing a PCEP session as given by the embodiment is provided accordingly, the device including:

a communicating end attribute configuring element configured for: at a PCC or a PCE node equipment side, when it is required to establish a PCEP session between the PCC and another PCE or between the PCE and another PCC or another PCE, allocating, via static configuration or dynamic designation, an attribute of the PCC or the PCE node equipment as a communicating end of a TCP connection for the PCEP session as a server or a client; and a PCEP session establishing element is configured for: establishing the PCEP session between the PCC and a peer PCE, or establishing the PCEP session between the PCE and a peer PCC or a peer PCE.

With an example of a scenario as in FIG. 1, when it is required to establish a PCEP session between PCE1 and PCE2, the communicating end attribute configuring element allocates, via static configuration or dynamic designation, the attribute of PCE1 as a communicating end of a TCP connection for the PCEP session as a server, and the attribute of PCE2 as a communicating end of a TCP connection for the PCEP session as a client.

With the static configuration, the attribute as a client or as a server in a PCEP session is designated before a node equipment or device deployed with a PCE function activates the PCE function.

With the dynamic designation, after a node equipment or device deployed with a PCE function activates the PCE function, the attribute as a client or as a server in a PCEP session is designated in accordance with a preset dynamic designation mechanism. the dynamic designation mechanism may be an electing mechanism, as described in Embodiment 2.

Embodiment 2

Figure 2:
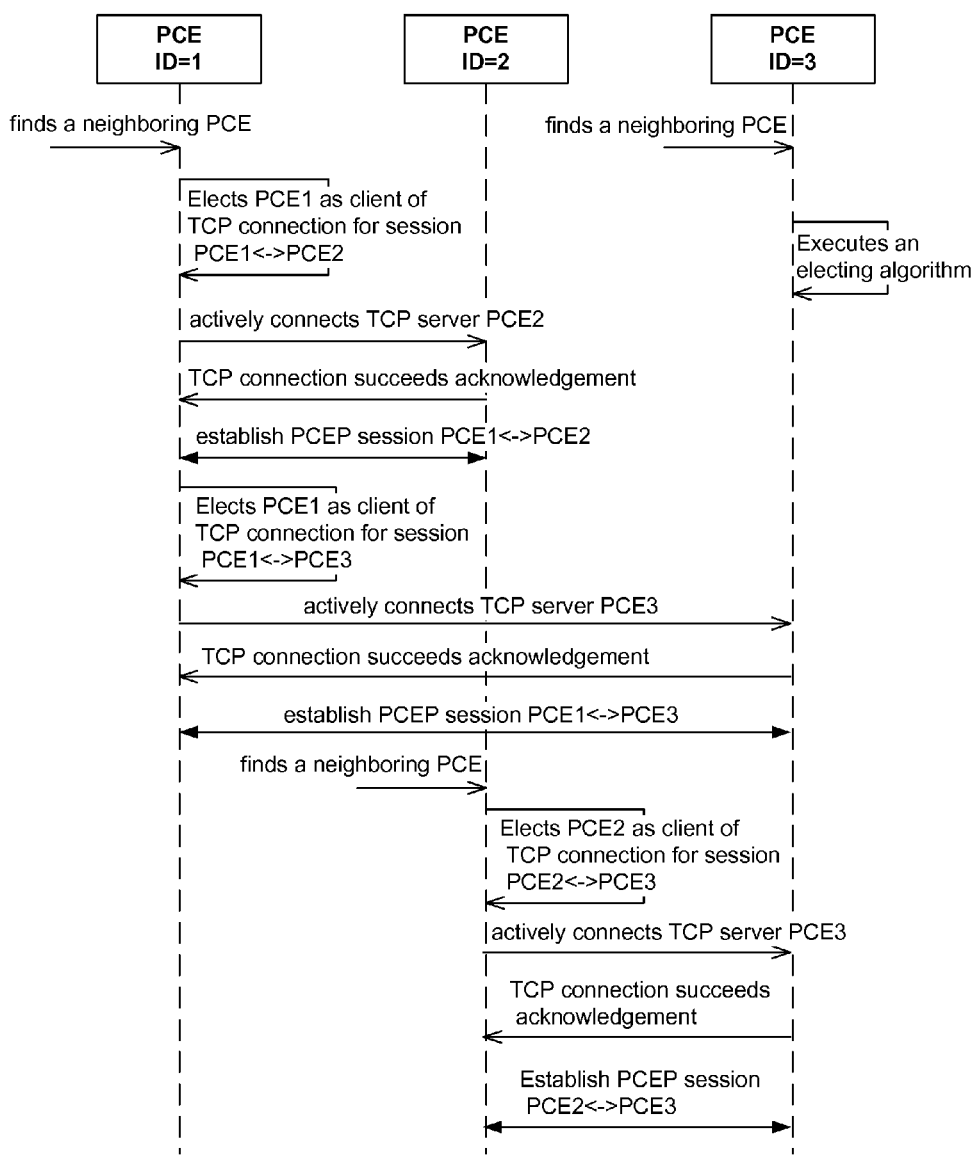
FIG. 2 is a schematic diagram of inter-PCE exchange in a flow of PCEP session establishment according to Embodiment 2 of the disclosure.

A flow of PCEP session establishment according to Embodiment 2 is as shown in FIG. 2. At a PCC or a PCE node equipment side, when it is required to establish a PCEP session between the PCC and another PCE or between the PCE and another PCC or another PCE, an attribute of the PCC or the PCE node equipment as a communicating end of a TCP connection for the PCEP session is automatically allocated, via an electing mechanism, as a server (intercepting connection of another PCC or PCE at a communication port 4189) or a client (actively seeking connection to a PCC or PCE node performing a monitoring service at a communication port 4189).

A device for implementing the method for establishing a PCEP session as given by the embodiment is provided accordingly, the device including:

an electing element configured for: at a PCC or a PCE node equipment side, when it is required to establish a PCEP session between the PCC and another PCE or between the PCE and another PCC or another PCE, automatically allocating, via an electing mechanism, an attribute of the PCC or the PCE node equipment as a communicating end of a TCP connection for the PCEP session as a server or a client; and a PCEP session establishing element configured for: establishing the PCEP session between the PCC and a peer PCE, or establishing the PCEP session between the PCE and a peer PCC or a peer PCE.

The electing mechanism may include but be not limited to that:

(1) in accordance with an IP address of a PCC or PCE at either of both ends between which the PCEP session is to be established, a PCC or a PCE with a greater IP address is elected as a server (or as a client);

(2) in accordance with the size of an area identifier (area ID) of a PCC or PCE at either of both ends between which the PCEP session is to be established in an autonomous domain, a PCC or PCE with a greater area ID in the autonomous domain is elected as a server (or as a client); or (3) in accordance with the size of an autonomous domain identifier of an autonomous domain to which a PCC or PCE at either of both ends between which the PCEP session is to be established belongs, a PCC or a PCE with a greater autonomous domain identifier is elected as a server (or as a client).

In addition, the attribute, as a server or as a client, of either of both ends that are to be in PCEP communication may be elected in accordance with any other unique, comparable parameter.

FIG. 2 is an example flowchart of implementing the method for establishing a PCEP session given by the embodiment based on the scenario as in FIG. 1, the flow including steps as follows.

In step 1, after activation, each of PCE1, PCE2, and PCE3 finds, via a finding mechanism, a neighboring PCE per se. PCE1 neighbors PCE2 and PCE3; PCE2 neighbors PCE1 and PCE3; and PCE3 neighbors PCE1 and PCE2.

In step 2, PCE1, PCE2, and PCE3 follow a same electing mechanism which, in the embodiment, is that: a PCE with a greater autonomous domain identifier serves as a TCP server in a PCEP session, and a PCE with a smaller autonomous domain identifier serves as a TCP client in a PCEP session. Therefore, a TCP connection table is produced as follows.

| PCE session | TCP server | TCP client |
|---|---|---|
| PCE1<->PCE2 | PCE2 | PCE1 |
| PCE1<->PCE3 | PCE3 | PCE1 |
| PCE2<->PCE3 | PCE3 | PCE1 |

In step 3, one of PCE1, PCE2, and PCE3 initiates a TCP connection request with a respective TCP server according to the TCP connection table produced by election. Here, a process of activation of a TCP monitoring service by a PCE at a communicating port 4189 is omitted;

In step 4, PCE1 receives TCP connection succeeds acknowledgements sent respectively by PCE2 and PCE3; and PCE2 receives a TCP connection succeeds acknowledgement sent by PCE3.

In step 5, PCE1 establishes a PCEP session respectively with PCE2 and PCE3; and PCE2 establishes a PCEP session with PCE3.

Embodiment 3

In the embodiment, at a PCC or a PCE node equipment side, when meeting a requirement for triggering establishment of a PCEP session, the PCC or the PCE first detects whether there is a TCP connection, established via three handshakes, to a peer PCE or a peer PCC with which the PCEP session is to be established; when there is no established TCP connection, the PCC or the PCE actively seeks a TCP connection to the peer as a client; when there is an established TCP connection, the PCC or the PCE detects whether there are multiple TCP connections established; when no more than one established TCP connection is detected and no PCEP session has been established with the peer PCE or the peer PCC, a flow of PCEP session establishment is activated; otherwise when multiple TCP connections established are detected, the multiple TCP connections detected are simultaneously disconnected, and the PCC or the PCE actively seeks a TCP connection to the peer as a client after waiting a random period of time. Note that no PCEP session can be established between two PCCs; a PCEP session can be established only between a PCC and a PCE, or between two PCEs.

Figure 4:
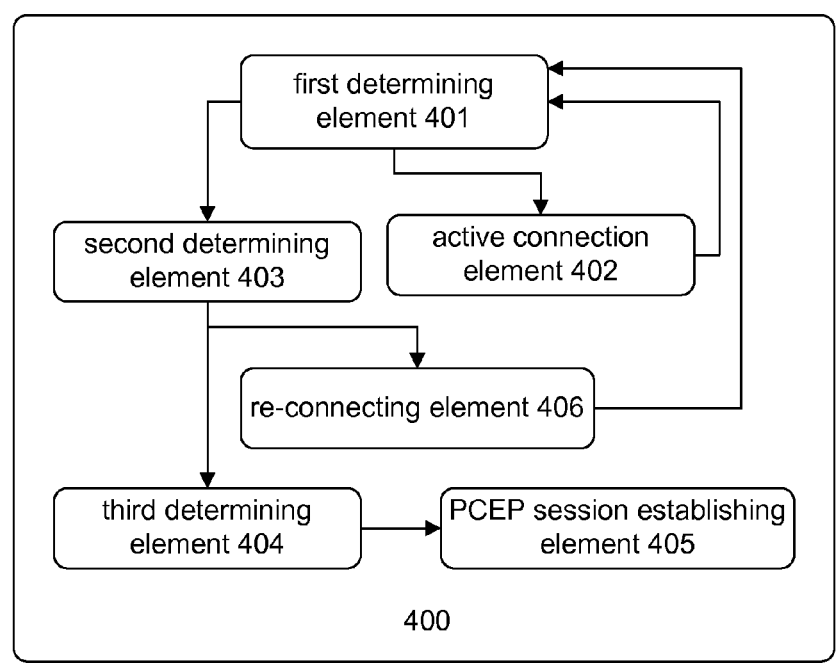
FIG. 4 is a schematic diagram of a structure of a device for establishing a PCEP session according to Embodiment 3 of the disclosure.

A device 400 for implementing the method for establishing a PCEP session as given by the embodiment is provided accordingly, the device applying to a PCC or a PCE; as shown in FIG. 4, the device 400 includes:

a first determining element 401 configured for: when a requirement for triggering establishment of a PCEP session is met, detecting whether there is an established TCP connection to a peer PCE or a peer PCC with which the PCEP session is to be established;

an active connection element 402 configured for: when there is no established TCP connection, actively seeking a TCP connection to the peer as a client;

a second determining element 403 configured for: when there is an established TCP connection, detecting whether there are multiple TCP connections established;

a third determining element 404 configured for: when no more than one established TCP connection is detected, determining whether a PCEP session has been established with the peer PCE or the peer PCC;

a PCEP session establishing element 405 configured for: when no more than one established TCP connection is detected and no PCEP session has been established with the peer PCE or the peer PCC, activating a flow of PCEP session establishment; and a re-connecting element 406 configured for: when multiple TCP connections established are detected, simultaneously disconnecting the multiple TCP connections detected, and actively seeking a TCP connection to the peer as a client after waiting a random period of time.

The requirement for triggering establishment of a PCEP session may include at least a PCE node activation or a special event; the special event may include at least a timer event or a PCEP message event.

Figure 3:
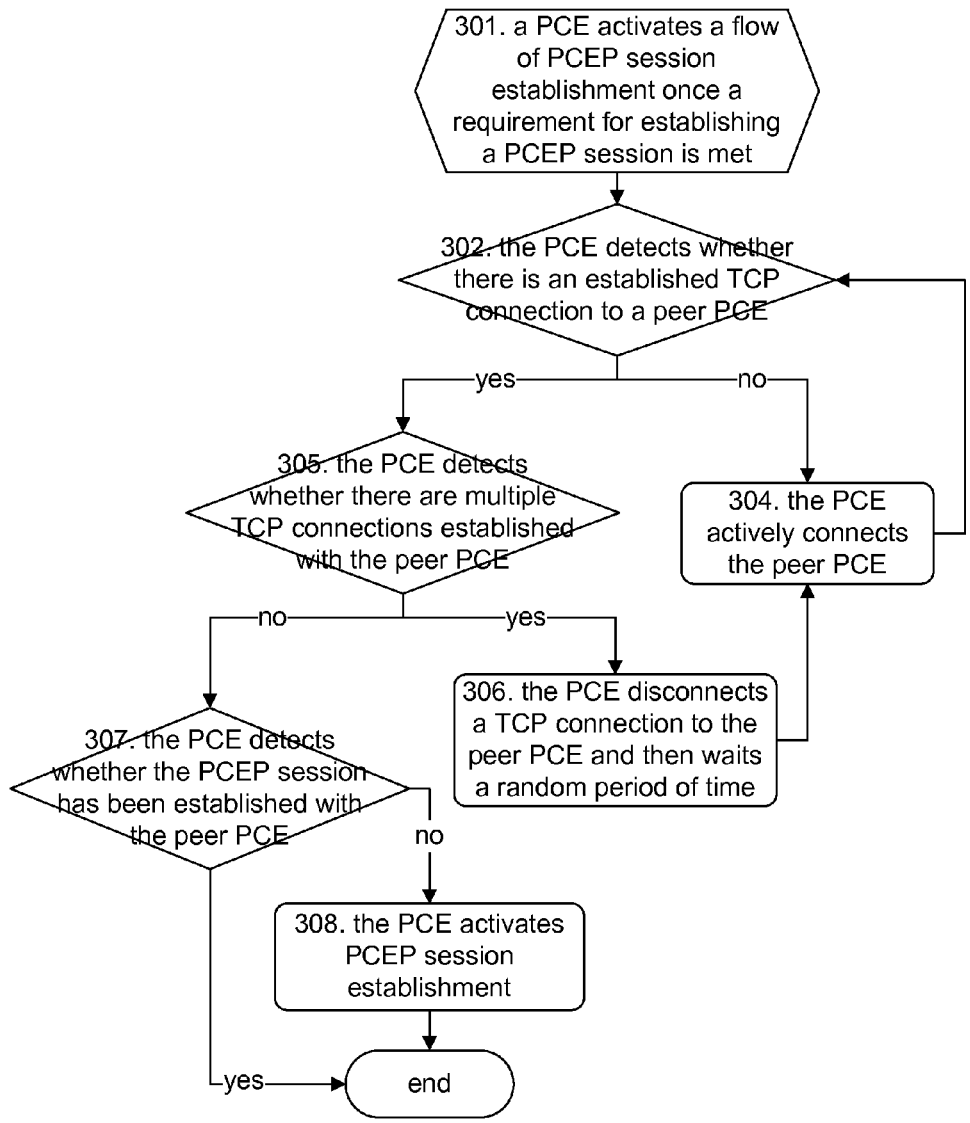
FIG. 3 is a processing flow of a single PCE in a flow of PCEP session establishment according to Embodiment 3 of the disclosure.

FIG. 3 is an example flowchart of implementing the method for establishing a PCEP session given by the embodiment based on the scenario as in FIG. 1, the flow including steps as follows.

In step 301, a PCE activates a flow of PCEP session establishment once a requirement for establishing a PCEP session is met, provided that: the PCE finds, via a finding mechanism, a neighboring PCE per se; and a TCP monitoring service has been created for the PCE at a communicating port 4189.

In step 302, the PCE detects whether there is an established TCP connection to a peer PCE.

In step 303, when the PCE detects that there is an established TCP connection to a peer PCE, the flow goes to step 305; or when the PCE detects that there is no established TCP connection to a peer PCE, the flow goes to step 304.

In step 304, the local PCE actively connects the peer PCE as a client of a TCP connection; and the flow goes to step 302;

In step 305, the PCE detects whether there are multiple TCP connections established with the peer PCE; when the PCE detects multiple TCP connections established, the flow goes to step 306; otherwise when the PCE detects no more than one established TCP connection, the flow goes to step 307.

In step 306, any TCP connection between the local PCE and the peer PCE is disconnected; the local PCE waits a random period of time; and then the flow goes to step 304. In the step, each of both TCP connection ends determines a local random period of time, and waits the local random period of time before initiating a TCP connection again.

In step 307, the PCE detects whether the PCEP session has been established with the peer PCE; when the PCE detects that the PCEP session has been established, the flow ends; otherwise when the PCE detects that the PCEP session has not been established, the flow goes to step 308.

In step 308, the PCE starts to establish the PCEP session with the peer.

What described are merely embodiments of the disclosure and are not intended to limit the scope of the disclosure.

The invention claimed is:

1. A method for establishing a Path Computation Element Communication Protocol (PCEP) session, comprising steps of:

at a Path Computation Client (PCC) or a Path Computation Element (PCE) node equipment side, when it is required to establish a PCEP session between the PCC and another PCE or between the PCE and another PCC or another PCE, automatically allocating, via an electing mechanism, an attribute of the PCC or the PCE node equipment as a communicating end of a TCP connection for the PCEP session as a server or a client, when a requirement for triggering establishment of a PCEP session is met, first detecting whether there is an established TCP connection to a peer PCE or a peer PCC with which the PCEP session is to be established; when there is no established TCP connection, actively seeking, by the PCC or the PCE, a TCP connection to the peer as a client, and executing again, by the PCC or the PCE, the step of detecting whether there is an established TCP connection to a peer PCE or a peer PCC with which the PCEP session is to be established; when there is an established TCP connection, detecting whether there are multiple TCP connections established; when no more than one established TCP connection is detected and no PCEP session has been established with the peer PCE or the peer PCC, activating a flow of PCEP session establishment; otherwise when multiple TCP connections established are detected, simultaneously disconnecting the multiple TCP connections detected, and after waiting a random period of time, actively seeking, by the PCC or the PCE, a TCP connection to the peer as a client, and executing again, by the PCC or the PCE, the step of detecting whether there is an established TCP connection to a peer PCE or a peer PCC with which the PCEP session is to be established, wherein the electing mechanism comprises at least one of:

of the PCC and the another PCE or of the PCE and the another PCC or the another PCE, electing a PCC or a PCE with a greater IP address as a server or a client;

of the PCC and the another PCE or of the PCE and the another PCC or the another PCE, electing in an autonomous domain a PCC or a PCE with a greater area identifier as a server or a client; and of the PCC and the another PCE or of the PCE and the another PCC or the another PCE, electing a PCC or a PCE with a greater autonomous domain identifier as a server or a client.

2. The method according to claim 1, wherein the requirement for triggering establishment of a PCEP session comprises at least a PCE node activation or a special event, wherein the special event comprises at least a timer event or a PCEP message event.

3. The method according to claim 1, wherein after the multiple TCP connections detected are simultaneously disconnected, a PCC or a PCE at one end of one of the disconnected TCP connections determines a local random period of time, and waits the local random period of time before actively seeking the TCP connection to the peer.

* * * * *